(12) United States Patent
Galvan et al.

(10) Patent No.: US 8,729,188 B2
(45) Date of Patent: May 20, 2014

(54) PROPYLENE POLYMER COMPOSITIONS

(75) Inventors: Monica Galvan, S. Maria Maddalena (IT); Marco Ciarafoni, Ferrara (IT); Gianni Collina, Ferrara (IT); Ofelia Fusco, Ferrara (IT); Roberto Pantaleoni, Ferrara (IT); Antonio Mazzucco, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 77 days.

(21) Appl. No.: 13/496,580

(22) PCT Filed: Aug. 26, 2010

(86) PCT No.: PCT/EP2010/062486
§ 371 (c)(1),
(2), (4) Date: Mar. 16, 2012

(87) PCT Pub. No.: WO2011/036021
PCT Pub. Date: Mar. 31, 2011

(65) Prior Publication Data
US 2012/0178881 A1     Jul. 12, 2012

Related U.S. Application Data

(60) Provisional application No. 61/277,734, filed on Sep. 29, 2009, provisional application No. 61/283,225, filed on Dec. 1, 2009.

(30) Foreign Application Priority Data

Sep. 22, 2009  (EP) .................................... 09170990
Nov. 17, 2009  (EP) .................................... 09176191

(51) Int. Cl.
*C08L 23/10*  (2006.01)
*C08L 23/12*  (2006.01)

(52) U.S. Cl.
USPC ........................................................ 525/240

(58) Field of Classification Search
USPC ........................................................ 525/240
See application file for complete search history.

(56) References Cited

U.S. PATENT DOCUMENTS

| | | | |
|---|---|---|---|
| 4,399,054 A | 8/1983 | Ferraris | |
| 4,469,648 A | 9/1984 | Ferraris | |
| 7,482,406 B2 * | 1/2009 | News et al. | 525/240 |
| 7,572,860 B2 * | 8/2009 | De Palo et al. | 525/191 |
| 7,872,074 B2 * | 1/2011 | Massari et al. | 525/191 |
| 2013/0095267 A1 * | 4/2013 | Cavalieri et al. | 428/36.91 |

FOREIGN PATENT DOCUMENTS

| | | |
|---|---|---|
| EP | 0045977 | 8/1981 |
| EP | 0361494 | 9/1989 |
| EP | 728769 | 8/1996 |
| EP | 782587 | 7/1997 |
| EP | 0395083 | 11/1997 |
| EP | 1272533 | 1/2003 |
| WO | WO-9844001 | 10/1998 |
| WO | WO-0063261 | 10/2000 |
| WO | WO-03076511 | 9/2003 |
| WO | WO-2004087807 | 10/2004 |
| WO | WO2005014713 | 2/2005 |
| WO | WO-2006037705 | 4/2006 |
| WO | WO-2006067023 | 6/2006 |
| WO | WO-2007-060114 | 5/2007 |
| WO | WO-2007/060114 | 5/2007 |
| WO | WO2010000792 | 1/2010 |
| WO | WO-2010146074 | 12/2010 |

* cited by examiner

*Primary Examiner* — Nathan M Nutter

(57) ABSTRACT

A propylene polymer composition comprising (percent by weight):
A) 74%-84% of a propylene homopolymer having a Polydispersity Index (P.I.) value of from 4.6 to 10, a fraction insoluble in xylene at 25° C., higher than 90%, and a MFR L (Melt Flow Rate according to ISO 1133, condition L, i.e. 230° C. and 2.16 kg load) from 110 to 200 g/10 min;
B) 16%-26%, of a copolymer of propylene with from 39% to 48%, of ethylene derived units;
the composition having an intrinsic viscosity of the fraction soluble in xylene at 25° C. comprised between 2.7 and 4.0 dl/g; and a MFR L (Melt Flow Rate according to ISO 1133, condition L, i.e. 230° C. and 2.16 kg load) from 30 to 80 g/10 min.

10 Claims, No Drawings

PROPYLENE POLYMER COMPOSITIONS

This application is the U.S. national phase of International Application PCT/EP2010/062486, filed Aug. 26, 2010, claiming priority to European Application 09170990.7 filed Sep. 22, 2009 and European Application 09176191.6 filed Nov. 17, 2009, and the benefit under 35 U.S.C. 119(e) of U.S. Provisional Application No. 61/277,734, filed Sep. 29, 2009 and U.S. Provisional Application No. 61/283,225 filed Dec. 1, 2009; the disclosures of International Application PCT/EP2010/062486, European Application 09170990.7, European Application 09176191.6, U.S. Provisional Application No. 61/277,734 and U.S. Provisional Application No. 61/283, 225, each as filed, are incorporated herein by reference.

The present invention relates to a propylene polymer composition having an optimum balance of properties in particular improved impact properties.

As is known, the isotactic polypropylene is endowed with an exceptional combination of excellent properties which render it suitable for a very great number of uses. In order to improve said properties into the propylene stereoregular homopolymerization process have been introduced one or more copolymerization steps or one or more monomer have been introduced in the homopolymer matrix.

WO 05/014713 relates to a heterophasic polyolefin composition comprising (percent by weight):

1) 65-95% of a crystalline propylene polymer selected from propylene homopolymer and random polymer of propylene with 0.1-10% of an a-olefin selected from ethylene, a $C_4$-$C_{10}$ alpha-olefin and a mixture thereof, the said polymer being insoluble in xylene at ambient temperature in an amount over 85% and having a polydispersity index ranging from 4 to 13, preferably 4.5 to 12, more preferably 5 to 9, and an intrinsic viscosity value over 2.2 dl/g, preferably 2.2 to 4.5 dl/g; and 2) 5-35% of an elastomeric olefin polymer of ethylene with a $C_3$-$C_{10}$ alpha-olefin and optionally a diene, having an ethylene content ranging from 15 to 85% and an intrinsic viscosity value of at least 1.4 dl/g, preferably from 2.5 to 5 dl/g.

WO 2006/037705 relates to an olefin polymer composition comprising (by weight, unless otherwise specified):

A) 60-85%, preferably 65-80%, more preferably 65-75%, of a crystalline propylene homopolymer or a crystalline copolymer of propylene containing 3% or less of ethylene or $C_4$-$C_{10}$ alpha-olefin(s) or of combinations thereof, said homopolymer or copolymer having a Polydispersity Index (P.I.) value of from 4.5-6, preferably 4.5-5.5, and a content of isotactic pentads (mmmm), measured by $^{13}C$ NMR on the fraction insoluble in xylene at 25° C., higher than 96%, preferably higher than 98%;

B) 15-40%, preferably 20-35%, more preferably 25-35%, of a partially amorphous copolymer of ethylene containing from 35% to 70%, preferably from 40 to 55%, of propylene or $C_4$-$C_{10}$ alpha-olefin(s) or of combinations thereof, and optionally minor proportions of a diene. Said olefin polymer composition exhibits a value of elongation at break ranging from 150 to 600%, preferably 200-500%, according to ISO method 527.

WO 2004/087807 relates to a propylene polymer composition comprising (by weight, unless otherwise specified):

A) 60-95%, of a propylene homopolymer, or a copolymer of propylene containing 3% or less of ethylene or $C_4$-$C_{10}$ alpha-olefin(s) or of combinations thereof, said homopolymer or copolymer having a Polydispersity Index (P.I.) value of from 4.6 to 10, preferably from 5.1 to 8 and a content of isotactic pentads (mmmm), measured by $^{13}C$ NMR on the fraction insoluble in xylene at 25° C., higher than 98 molar %, preferably from 98.5 to 99.5 molar %;

B) 5-40%, preferably 10-35%, of a copolymer of ethylene containing from 40% to 70%, preferably from 47 to 62%, of propylene or $C_4$-$C_{10}$ alpha-olefin(s) or of combinations thereof, and optionally minor proportions of a diene; said composition having a Temperature Rising Elution Fractionation (TREF) profile, obtained by fractionation in xylene and collection of fractions at temperatures of 40° C., 80° C. and 90° C., in which the ethylene content Y of the fraction collected at 90° C. satisfies the following relation (I):

$$Y \leq 0.8 + 0.035X + 0.0091X_2$$

wherein X is the ethylene content of the fraction collected at 40° C. and both X and Y are expressed in percent by weight (referred to the respective fractions), and having a value of intrinsic viscosity of the fraction soluble in xylene at 25° C. of from 1.8 to 4.2 dl/g, preferably from 2 to 4.2 dl/g, more preferably from 2.3 to 3.8.

The applicant found that it is possible to achieve improved properties especially in term of impact strength by selecting particular amounts of component A) and component B) said components having particular properties.

The object of the present invention is a propylene composition comprising (percent by weight):

A) 74%-84%, preferably 77%-82%, more preferably 78%-81%, of a propylene homopolymer having a Polydispersity Index (P.I.) value of from 4.6 to 10, preferably from 5.1 to 8; a fraction insoluble in xylene at 25° C., higher than 90%, preferably higher than 95% more preferably higher than 97%; and a MFR L (Melt Flow Rate according to ISO 1133, condition L, i.e. 230° C. and 2.16 kg load) from 110 to 200 g/10 min, preferably from 120 to 180 g/10 min more preferably from 130 to 160 g/10 min;

B) 16%-26%, preferably 18%-23%, more preferably 18%-22% of a copolymer of propylene with from 39% to 48%, preferably from 39% to 47%; more preferably from 39% to 41% of ethylene derived units;

the composition having an intrinsic viscosity of the fraction soluble in xylene at 25° C. comprised between 2.5 and 4.0 dl/g; preferably between 2.7 and 4.0 dl/g more preferably between 3.0 and 3.5 dl/g and a MFR L (Melt Flow Rate according to ISO 1133, condition L, i.e. 230° C. and 2.16 kg load) from 30 to 80 g/10 min preferably from 40 to 70 g/10 min more preferably from 45 to 60 g/10 min.

From the above definitions it is evident that the term "copolymer" includes polymers containing only two kinds of comonomers.

With composition of the present invention it is possible to achieve improved values of Izod at 23° C., 0° C. and −20° C. and maintaining the same flexural modulus with respect to a composition having the same content of A) and B) with B) having the same ethylene content.

Other preferred features for the compositions of the present invention are:

a Flexural Modulus is comprised between 1300 MPa and 2000 MPa, preferably comprised between 1300 and 1800 MPa;

Izod impact strength measured at 23° C. higher than 5 kJ/m$^2$; preferably comprised between 5.2 and 20 kJ/m$^2$; more preferably comprised between 6.0 and 12 KJ/m$^2$ even more preferably comprised between 6.4 and 10 KJ/m$^2$;

Izod impact strength measured at 0° C. higher than 4.7 kJ/m$^2$; preferably comprised between 5 and 20 kJ/m$^2$;

more preferably comprised between 5.1 and 12 KJ/m²'
even more preferably comprised between 5.3 and 10 KJ/m²;

Izod impact strength measured at −20° C. higher than 3.8 KJ/m²; preferably comprised between 4.0 and 10 KJ/m²;

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage. Preferably, each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application W000163261.

Preferably, the solid catalyst component comprises Mg, Ti, halogen and an electron donor.

The electron donor can be selected from succinates of formula (I):

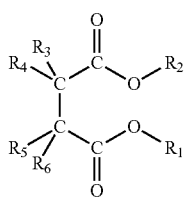

(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

$R^1$ and $R^2$ are preferably $C_1$-$C_8$ alkyl, cycloalkyl, aryl, arylalkyl and alkylaryl groups.

Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R^3$ to $R^3$ are hydrogen and $R^6$ is a branched alkyl, cycloalkyl, aryl, arylalkyl and alkylaryl radical having from 3 to 10 carbon atoms. Another preferred group of compounds within those of formula (I) is that in which at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

Particularly preferred are the compounds in which the two radicals different from hydrogen are linked to the same carbon atom. Furthermore, also the compounds in which at least two radicals different from hydrogen are linked to different carbon atoms, that is $R^3$ and $R^5$ or $R^4$ and $R^6$ are particularly preferred.

In a alternative embodiment the electron donor can be of the type described in EP 09163192.9. According to a preferred method, the solid catalyst component can be prepared by reacting a titanium compound of formula $Ti(OR)_{n-y}X_y$ where n is the valence of titanium and y is a number between 1 and n, preferably TiC4, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130"C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with Tic4 can be carried out one or more times. The internal donor can be added during the treatment with $TiCl_4$ and the treatment with the electron donor compound can be repeated one or more times. Generally, the succinate of formula (I) is used in molar ratio with respect to the MgCl2 of from 0.01 to 1 preferably from 0.05 to 0.5. The preparation of catalyst components in spherical form is described for example in European patent application EP-A-395083 and in the International patent application W098144001. The solid catalyst components obtained according to the above method show a surface area (by B.E.T. method) generally between 20 and 500 m21 g and preferably between 50 and 400 m21 g, and a total porosity (by B.E.T. method) higher than 0.2 cm31 g preferably between 0.2 and 0.6 cm31 g. The porosity (Hg method) due to pores with radius up to 10.000 A generally ranges from 0.3 to 1.5 cm31 g, preferably from 0.45 to 1 cm31 g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external electron donor compounds is that of silicon compounds of formula $R_a^5 R_b^6 Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The propylene polymer compositions of the present invention may further comprise additives commonly employed in the polyolefin field, such as antioxidants, light stabilizers, nucleating agents, antiacids, colorants and fillers.

The main application of the propylene polymer compositions of the invention is the production of molded articles, particularly injection-molded items. The injection-molded articles comprising the propylene polymer compositions of the invention have good flexibility and good impact properties and are also endowed with good transparency.

The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content

By IR Spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses

Determined by gas-chromatography

Melt Flow Rate (MFR)

Determined according to ISO 1133 (230° C., 2.16 Kg)

Intrinsic Viscosity

Determined in tetrahydronaphthalene at 135° C.

Flexural Modulus

Determined according to ISO 178

Stress at Yield and at Break

Determined according to ISO 527

Elongation at Yield and Break

Determined according to ISO 527

IZOD Impact Strength

Determined according to ISO 18011A

Melting Temperature, Melting Enthalpy and Crystallization Temperature

Determined by DSC with a temperature variation of 20° C. per minute

Polydispersity Index (PI):

measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the loss modulus.

Examples 1-3 and Comparative Examples 1-2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2 \cdot 2.8C_2H_5OH$ (prepared according to the method described in ex. 2 of U.S. Pat. No. 4,399,054 but operating at 3000 rpm instead of 10000 rpm) and 7.4 mmol of diethyl 2,3-diisopropylsuccinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C.

Catalyst System and Prepolymerization Treatment

Before introducing it into the polymerization reactors, the solid catalyst component described above is contacted at 12° C. for 24 minutes with aluminum triethyl (TEAL) and dicyclopentyldimethoxysilane (DCPMS). The weight ratio of TEAL to the solid catalyst component in indicated in table 1, the weight ratio TEAL/DCPMS is indicated in table 1.

The catalyst system is then subjected to prepolymerization by maintaining it in suspension in liquid propylene at 20° C. for about 5 minutes before introducing it into the first polymerization reactor.

Polymerization

The polymerization run is conducted in continuous mode in a series of three reactors equipped with devices to transfer the product from one reactor to the one immediately next to it. The first two reactors are liquid phase reactors, and the third is a fluid bed gas phase reactor. Component (A) is prepared in the first and second reactor, while component (B) is prepared in the third.

Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced are reported in Table 1.

Then the polymer particles are introduced in a rotating drum, wherein they are mixed with 0.06% by weight of Irganox 1010 and 0.06 by weight of Irgafos 168, 0.2% by weight of GMS90 (glycerin monostearate), 0.09 by weight of Atmer 163 and 0.09% by weight of Na Benzoate, to obtain a nucleated composition. The previously said Irganox 1010 is pentaerytrityl tetrakis 3-(3,5-di-tert-butyl-4-hydroxyphenyl)propanoate, while Irgafos 168 is tris(2,4-di-tert-butylphenyl) phosphite.

Then the polymer particles are extruded under nitrogen atmosphere in a twin screw extruder, at a rotation speed of 250 rpm and a melt temperature of 200-250° C. The polymers features are reported in table 2

TABLE 1

| Example 1 | | Comp ex 1 | Ex. 1 | Comp ex 2 | Ex. 2 |
|---|---|---|---|---|---|
| TEAL/solid catalyst component weight ratio | | 7 | 7 | 16 | 15 |
| TEAL/DCPMS weight ratio | | 4 | 4 | 10 | 5 |
| Liquid phase reactors | | | | | |
| Polymerisation temperature | ° C. | 70 | 75 | 75 | 75 |
| Pressure | Bar-g | 42 | 40 | 40 | 40 |
| Residence time | minutes | 70 | 50 | 65 | 64 |
| H2 bulk | molppl | 7300 | 8100 | 4000 | 6700 |
| 1st gas phase reactor | | | | | |
| Polymerisation temperature | ° C. | 80 | 80 | 80 | 80 |
| Pressure | Barg | 14 | 16 | 15 | 15 |
| Residence time | min | 20 | 22 | 25 | 29 |
| C2/(C2 + C3) | Mol ratio | 0.32 | 0.28 | 0.29 | 0.27 |
| H2/C2 | Mol ratio | 0.1 | 0.047 | 0.08 | 0.059 |

C2 = ethylene; C3 = propylene; H2 = hydrogen

TABLE 2

| | | Example | | | |
|---|---|---|---|---|---|
| | | Comp ex 1 | Ex. 1 | Comp ex 2 | Ex. 2 |
| Component a) | | | | | |
| Homopolymer content | % | 81 | 81 | 80 | 80 |
| MFR "L" | g/10' | 80 | 140 | 104 | 138 |
| Xylene soluble fraction | wt % | 2.2 | 2.7 | 1.9 | 2.2 |
| Component b) | | | | | |
| Copolymer content | wt % | 19 | 19 | 20 | 20 |
| Ethylene content in component b) | wt % | 40 | 40 | 40 | 44 |
| Intrinsic viscosity of the Xylene soluble fraction | dl/g | 2.25 | 3.11 | 2.37 | 3.20 |
| Property of the composition | | | | | |
| Ethylene content | wt % | 8 | 7.7 | 7.4 | 9 |
| Xylene—soluble fraction | wt % | 18.8 | 19.3 | 18.2 | 19 |
| MFR | g/10' | 44 | 53 | 46 | 55 |
| Flexural Modulus | MPa | 1455 | 1455 | 1440 | 1450 |
| Izod at 23° C. | KJ/m2 | 4.6 | 6.5 | 4.8 | 7.2 |
| Izod at 0° C. | KJ/m2 | 3.9 | 5.4 | 4.6 | 5.5 |
| Izod at −20° C. | KJ/m2 | 2.9 | 4.2 | 3.8 | 4.2 |
| Tens. Str. @ yield | MPa | 25.7 | 26.1 | 26.3 | 24.9 |
| Elong. @ yield | % | 4.4 | 4.6 | 4.8 | 4.0 |
| Tens. Str. @ break | MPa | 18.9 | 18.3 | 21.3 | 21.2 |

By comparing examples 1 and 2 of the present invention and comparative examples 1-2 it is clear that the impact properties have improved izod properties while the flexural modulus is about the same at the same ethylene content and amount of components A) and B).

The invention claimed is:

1. A propylene polymer composition comprising (percent by weight):
   A) 74%-84% of a propylene homopolymer having a Polydispersity Index (P.I.) value of from 4.6 to 10, a fraction insoluble in xylene at 25° C., higher than 90%, and a MFR L (Melt Flow Rate according to ISO 1133, condition L, 230° C. and 2.16 kg load) from 110 to 200 g/10 min; and
   B) 16%-26%, of a copolymer of propylene with from 39% to 48%, of ethylene derived units;
   the composition having a fraction soluble in xylene at 25° C., wherein the fraction soluble in xylene has an intrinsic viscosity between 2.5 and 4.0 dl/g; and an MFR L (Melt Flow Rate according to ISO 1133, condition L, 230° C. and 2.16 kg load) from 30 to 80 g/10 min.

2. The composition according to claim 1 wherein the MFR L of component A) is from 120 to 180 g/10 min.

3. The composition according to claim 1 wherein the content of ethylene derived units in component B) is from 39% to 47% by weight.

4. The composition according to claim 1 wherein the intrinsic viscosity of the fraction soluble in xylene at 25° C. is between 3.0 and 3.5 dl/g.

5. The composition according to claim 1, wherein the composition has a Flexural Modulus between 1300 MPa and 2000 MPa.

6. The composition according to claim 1, wherein the composition has a MFR L from 46 to 70 g/10 min.

7. The composition according to claim 1, wherein the composition has an Izod impact strength measured at 23° C. higher than 5 kJ/m$^2$.

8. The composition according to claim 7 wherein the composition has an Izod impact strength between 5.2 and 20 kJ/m$^2$.

9. The composition according to claim 8 wherein the composition has an Izod impact strength between 6.0 and 12 kJ/m$^2$.

10. A thermoformed article comprising
a propylene polymer composition comprising (percent by weight):
A) 74%-84% of a propylene homopolymer having a Polydispersity Index (P.I.) value of from 4.6 to 10, a fraction insoluble in xylene at 25° C., higher than 90%, and a MFR L (Melt Flow Rate according to ISO 1133, condition L, 230° C. and 2.16 kg load) from 110 to 200 g/10 min; and
B) 16%-26%, of a copolymer of propylene with from 39% to 48%, of ethylene derived units;
the composition having a fraction soluble in xylene at 25° C., wherein the fraction soluble in xylene has an intrinsic viscosity between 2.5 and 4.0 dl/g; and an MFR L (Melt Flow Rate according to ISO 1133, condition L, 230° C. and 2.16 kg load) from 30 to 80 g/10 min.

\* \* \* \* \*